J. J. LOWE.
Farm and Road Scraper.

No. 217,016. Patented July 1, 1879.

Attest:
Darius W. Lowe
Laviah Lowe

Inventor:
Jay J. Lowe

UNITED STATES PATENT OFFICE.

JAY J. LOWE, OF RIDGEWAY, MICHIGAN, ASSIGNOR OF ONE-HALF HIS RIGHT TO DARIUS W. LOREE, OF SAME PLACE.

IMPROVEMENT IN FARM AND ROAD SCRAPERS.

Specification forming part of Letters Patent No. 217,016, dated July 1, 1879; application filed March 25, 1878.

*To all whom it may concern:*

Be it known that I, JAY J. LOWE, of Ridgeway, in the county of Lenawee and State of Michigan, have invented a new and Improved Implement known as a "Farm and Road Scraper;" and I do hereby declare that the following is a full, clear, and exact description of the construction and operation of the same, reference being had to the annexed drawings, making a part of this specification, in which the three figures are perspective views of the scraper in the several stages of its operation.

Figure 1:
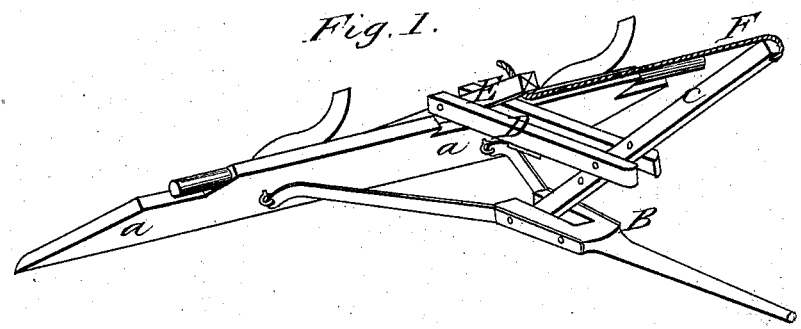
Figure 2:
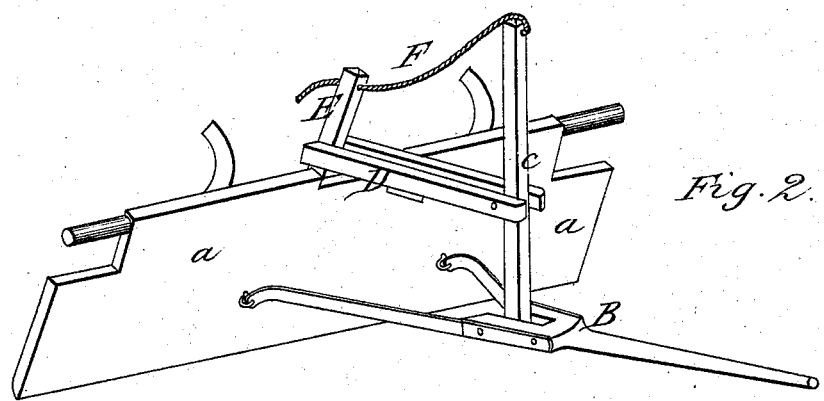
Figure 3:
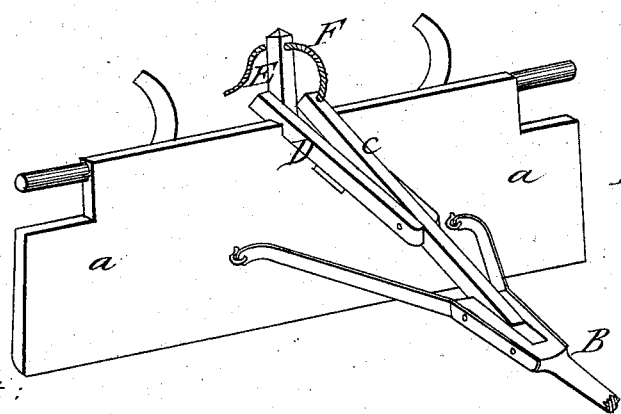

Figure 3 shows the scraper as loaded, with the lever raised, ready to unload; Fig. 2, in the act of unloading, and Fig. 1 as unloaded.

Letters *a a* of drawings represent a board scraper—such as has long been in use among farmers.

The improvement for which a patent is claimed is further and more clearly described as follows, to wit:

The tongue B, as shown in the drawings, is fastened to the draw-irons of a board scraper, and has a slot at the rear end, into which the lower end of the lever *c* enters and is held in place by a movable bolt.

The lever *c* may be of any size in breadth and thickness, from one inch to two and one-half inches, and of a length just sufficient to reach from its connection with the tongue to the center of the top of the scraper *a a* when in a position to be loaded with earth.

In the lever *c* are three small holes, as shown in the drawings, passing through it horizontally, from one to two inches apart, at or near a point about one-third of its length from its lower end, which holes are made behind the central line of the lever.

The lever *c* is attached to the frame D by a bolt, which passes horizontally through the lower end of the frame D, and also through either one of the holes above described in the lever *c*.

The frame D consists of two pieces of wood, of the same size in breadth and thickness as the lever *c*, and of a length just sufficient to reach from its attachment to the lever *c* to the back edge of the upright E.

When the scraper is in a position to load, as shown in Fig. 3, the two pieces of wood which constitute the frame D are firmly joined together by a single cross-bar of wood or iron, fastened upon the under side, and are placed parallel with each other, just far enough apart to easily admit the lever *c* lengthwise.

The upper end of the frame D rests upon the upper edge of the scraper *a a*, and is held in position by a bolt, which passes horizontally through the frame D and the upright E.

The upright E is made from a piece of wood of the same size in breadth and thickness as the lever *c*, and is bolted firmly upon the center of the back of the scraper *a a*, and rises to a height of from eight to ten inches above its point of attachment to the frame D, and has a hole at the upper end large enough for the easy passage of a half-inch rope, which rope is shown in the drawings and marked F. The rope F is securely fastened to the upper end of the lever *c*.

The operation of the device may be described as follows: It must first be placed in the position represented by Fig. 3 of the drawings, except only that the lever *c* must be thrown down even with and into the frame D, and remain there until the scraper is loaded, and, being thus placed in position, the scraper is ready for work—*i. e.*, for loading. After being put in motion all the assistance that is required to enable it to take on a full load, in any kind of soil or in any variety of work, (as in cleaning out drains where there is water,) is for the operator to stand upright upon the top of the scraper. To unload, the lever is raised from its place in the frame by pulling upon the rope and then immediately giving the rope slack. To discharge the load at once in one place, let the slack be given out entirely immediately after raising the lever. To spread the load evenly over a large surface, let the slack be given out gradually; and in either case the team must be kept going. After unloading, the scraper is again set for work by pulling upon the rope until the lever *c* is again brought back to its former position in the frame D.

What I claim as my invention, and desire to secure by Letters Patent, is—

The combination of the tongue B, the lever *c*, the frame D, the upright E, and the rope F with the scraper *a a*, all constructed substantially as and for the purpose described.

In presence of— JAY J. LOWE.

DARIUS W. LOREE,
JARIAH LOREE.